United States Patent [19]

Bertus et al.

[11] Patent Number: 4,584,283
[45] Date of Patent: Apr. 22, 1986

[54] CRACKING CATALYST RESTORATION WITH ALUMINUM COMPOUNDS

[75] Inventors: Brent J. Bertus; H. Wayne Mark; Dwight L. McKay, all of Bartlesville, Okla.

[73] Assignee: Phillips Petroleum Company, Bartlesville, Okla.

[21] Appl. No.: 427,256

[22] Filed: Sep. 29, 1982

Related U.S. Application Data

[63] Continuation of Ser. No. 175,622, Aug. 5, 1980, abandoned.

[51] Int. Cl.$^4$ .................. B01J 29/38; C10G 11/05; C10G 11/18
[52] U.S. Cl. .................. 502/31; 208/52 CT; 208/120; 502/20; 502/34; 502/38; 502/521
[58] Field of Search ............ 252/411 R, 411 S, 412, 252/413, 414, 416, 437, 439, 455 R, 455 Z; 208/52 CT; 502/521, 31, 34, 38, 20

[56] References Cited

U.S. PATENT DOCUMENTS

| | | | |
|---|---|---|---|
| 2,129,693 | 9/1938 | Houdry | 196/52 |
| 2,582,254 | 1/1952 | Hunter | 252/455 R |
| 2,758,097 | 8/1956 | Doherty et al. | 252/413 |
| 2,850,462 | 9/1958 | Plank | 252/411 |
| 2,897,136 | 7/1959 | Pardee | 208/119 |
| 2,901,419 | 8/1959 | Brill | 208/119 |
| 2,921,018 | 1/1960 | Helmers et al. | 208/114 |
| 2,977,322 | 3/1961 | Varvel et al. | 252/411 |
| 3,242,069 | 3/1966 | Gladrow | 252/455 R |
| 3,324,044 | 6/1967 | Oberhofer | 252/412 |
| 3,630,889 | 12/1971 | Arey et al. | 208/114 |
| 3,827,967 | 8/1974 | Nap et al. | 208/48 R |
| 3,906,054 | 9/1975 | Kaeding et al. | 260/683.43 |
| 3,972,832 | 8/1976 | Butter et al. | 252/437 |
| 4,011,276 | 3/1977 | Chu | 260/672 T |
| 4,025,458 | 5/1977 | McKay | 252/416 |
| 4,115,249 | 9/1978 | Blanton, Jr. et al. | 208/120 |
| 4,141,858 | 2/1979 | McKay | 252/439 |
| 4,158,621 | 6/1979 | Swift et al. | 208/114 |
| 4,190,552 | 2/1980 | Bertus et al. | 252/411 R |
| 4,198,320 | 4/1980 | Chester et al. | 252/455 |
| 4,209,453 | 6/1980 | Bertus et al. | 252/414 |
| 4,289,608 | 9/1981 | McArthur | 208/121 |
| 4,317,713 | 3/1982 | Burk, Jr. et al. | 252/414 |
| 4,318,799 | 3/1982 | Yoo | 208/114 |
| 4,321,128 | 3/1982 | Yoo | 252/412 |
| 4,337,144 | 6/1982 | Yoo | 208/114 |

FOREIGN PATENT DOCUMENTS

729167  3/1966  Canada .................. 252/411 R

*Primary Examiner*—P. E. Konopka
*Attorney, Agent, or Firm*—John R. Casperson

[57] ABSTRACT

A method of restoring activity to a cracking catalyst which has been at least partially deactivated by metals contamination which involves contacting the cracking catalyst with a treating agent comprising a source of aluminum.

6 Claims, No Drawings

4,584,283

CRACKING CATALYST RESTORATION WITH ALUMINUM COMPOUNDS

This application is a continuation of application Ser. No. 175,622, filed Aug. 5, 1980, now abandoned.

BACKGROUND OF THE INVENTION

The present invention relates to catalysts. In another aspect, the present invention relates to hydrocarbon cracking catalysts. In still another aspect, the invention relates to restoring the activity of hydrocarbon cracking catalysts. In yet another aspect, the invention relates to cracking a hydrocarbon feedstock.

Contaminants, for example, nickel, vanadium, and iron are found in significant concentrations in hydrocarbon feedstocks such as, for example, heavy oil fractions and in lower quality crude oils. These contaminants have a poisoning effect on the catalysts employed to convert these oils into gasoline and other valuable petroleum products, making processing of these oils economically unattractive. Unfortunately, because of the limited supplies of oils containing low levels of contaminants, it is necessary to employ metals contaminated oils in hydrocarbon processes, such as catalytic cracking processes.

The contaminants found in feedstocks to cracking processes become deposited on the catalytic catalyst. The deposition on the catalyst of, for example, nickel, vanadium and iron, causes a decrease in the activity of the cracking catalyst the hydrocarbon feedstock into cracked products, including gasoline. The selectivity of the cracking catalyst for cracking the feedstock into gasoline as manifested by the portion of cracked products comprising gasoline is also decreased. The production of undesirable products, for example, hydrogen and methane, which must be compressed, necessitating additional equipment; and coke, which is deposited on the catalyst and must be burned off, requiring additional equipment and "off time", during which the catalyst is not employed for cracking is significantly increased.

Because of these problems, the industry often replaces cracking catalysts contaminated by more than about 3,000 parts per million (ppm) of vanadium equivalents and iron. As used herein, the term vanadium equivalents is the measure of the combined parts by weight of vanadium and four times the nickel per million by weight of cracking catalyst including the weight of nickel, vanadium and iron on the cracking catalyst. There is thus a need for a cracking process suitable for use with contaminated feedstocks and contaminated cracking catalysts. There is also a need for a cracking catalyst which is only minimally affected by deposits thereon of contaminants selected from nickel, vanadium and iron. There is also a need for a process of treating a contaminated cracking catalyst to increase its activity for conversion of the feedstock and selectivity for producing gasoline and to decrease the catalyst selectivity for undesirable products, for example, hydrogen and coke.

OBJECTS OF THE INVENTION

It is thus an object of the present invention to provide a method for restoring the activity of a contaminated cracking catalyst.

It is a further object of this invention to provide a restored cracking catalyst wherein contaminants such as nickel, vanadium and iron on cracking catalyst are passivated.

It is another object of this invention to provide a process for cracking hydrocarbons wherein the deleterious effects caused by metals on the cracking catalyst are at least mitigated.

These and other objects of the present invention will be more fully explained in the followig detailed disclosure of the invention and the appended claims.

SUMMARY OF THE INVENTION

In accordance with the present invention, a catalyst composition comprises a cracking catalyst and a treating agent selected from aluminum and aluminum compounds.

Further, according to the invention, a contaminated cracking catalyst is improved by contacting the cracking catalyst with aluminum or a compound thereof.

Still further in accordance with the invention, a hydrocarbon feedstock is catalytically cracked employing the above described catalyst composition.

Still further, according to the invention, at least one metal selected from nickel, vanadium and iron in contact with a cracking catalyst is passivated by contacting the cracking catalyst with a treating agent selected from aluminum and aluminum compounds.

Still further, according to the invention, a used cracking catalyst contaminated by at least 3000 ppm vanadium equivalents, is at least partially restored by contact with a treating agent selected from aluminum and aluminum compounds.

DETAILED DESCRIPTION OF THE INVENTION

It has been discovered that the adverse effects of nickel, vanadium and iron on a cracking catalyst can be at least mitigated by contacting the cracking catalyst with a treating agent selected from aluminum and aluminum compounds. The treating agent can be selected from most any source of aluminum such as elemental aluminum, inorganic aluminum compounds, and organic aluminum compounds. Suitable inorganic aluminum compounds include salts, for example, aluminum nitrate, aluminum sulfate, or alums that have the empirical formula $AlM(SO_4)_2$, where M is $NH_4^+$ or a member of Group IA of the periodic table, as found at page 83 of the Handbook of Chemistry and Physics, 54th edition (1973-74), published by the Chemical Rubber Company Press, Cleveland Ohio. Less preferred are halogen-containing aluminum salts, for example, $AlX_3$ or $Al(XO_3)_3$, where X is selected from the group Cl, Br and I, because of the corrosive effect of these halogens on process equipment. Suitable organic compounds can be represented generally by the formula $AlR_3$ wherein R is an organic moiety. Included within this group are the salts of carboxylic acids, $(R'COO)_3Al$ wherein R' is hydrogen or a hydrocarbyl radical having from 1 to about 20 carbon atoms. Examples of suitable carboxyl compounds include aluminum acetate, aluminum propionate, aluminum butyrate, aluminum decanoate, aluminum stearate, and the like. Polyfunctional carboxylates, such as aluminum citrate, can also be utilized. Other suitable organic compounds are for example, aluminum tris(hydrocarbyl oxide)s—$Al(OR'')_3$—wherein R'' preferably contains one to about 20 carbon atoms and can be an alkyl, alkenyl, cycloalkyl, or aryl radical, or a combination of radicals such as alkylaryl, arylalkyl, alkylcycloalkyl, and the like. Examples of suitable oxyhydrocarbyl compounds are aluminum isopropoxide, aluminum ter-butoxide, aluminum phenoxide, aluminum decycloxide, and the like. Other suitable organic compounds are for example, aluminum alkyls—AlR'''$_3$—where R''' can be an alkyl group containing 1–20 carbon atoms, preferably one to five carbon atoms. Examples of suitable hydrocarbyl compounds are triethylaluminum, tributylaluminum, diethylpentylaluminum, and the like. It is recognized that these compounds are pyrophoric and must be treated accordingly. R', R'', and R''' can be substituted with, for example, halogen, sulfur, phosphorous or nitrogen. Of course, mixtures of any of the above compounds may be utilized. The aluminum-containing treating agent of this invention can also be utilized in combination with other passivating agents, for example, passivating agents containing elements selected from Groups IVA, VA and VIA of the Periodic Table.

It is most preferable in accordance with the present invention to contact the cracking catalyst with at least one promoting agent selected from sulfur compounds and phosphorus compounds in addition to the at least one aluminum compound. The source of phosphorus employed in this aspect of invention can vary widely and can be any phosphorus composition which will enhance the passivation qualities of aluminum, or the promotion quality of sulfur for enhancing the passivating qualities of aluminum. Exemplary inorganic sources of phosphorus usefully employed in accordance with the invention include the white, red, violet and yellow forms of elemental phosphorus. Phosphorus halides for example phosphorus fluoride, phosphorus chloride, phosphorus bromide, phosphorus iodide and heterohalides such as phosphorus dibromotrichloride can also be usefully employed. Nitrogen containing inorganic phosphorus compounds such as phosphorus dichloronitride and phosphorus cyanide can also be used as the phosphorus source. Phosphine is also suitable for use. Exemplary of suitable phosphorus oxides which can be used in accordance with the invention are phosphorus trioxide, phosphorus tetraoxide, phosphorus pentaoxide, and phosphorus sesquioxide. Oxygen containing phosphorus compounds for example phosphorus oxychloride, phosphorus oxybromide, phosphorus oxybromide dichloride, phosphorus oxyfluoride, and phosphorus oxynitride can also be used in accordance with the invention. Phosphorus selenides and phosphorus tellurides can also be used in accordance with the invention. Exemplary of this class of compounds are phosphorus triselenide and phosphorus pentaselenide. Exemplary of suitable phosphorus acids which can be used in accordance with the invention are hypophosphorous acid, metaphosphoric acid, orthophosphoric acid, and pyrophosphoric acid. The source of sulfur employed in this aspect of invention also can vary widely and can be any sulfur composition which will enhance the passivation qualities of aluminum or the promotion quality of phosphorus for enhancing the passivation qualities of aluminum. Exemplary inorganic sources for sulfur include the alpha, beta and gamma forms of elemental sulfur. Sulfur halides such as sulfur monofluoride, sulfur tetrafluoride, disulfur decafluoride, sulfur monochloride, sulfur dichloride, sulfur tetrachloride, sulfer monobromide and sulfur iodide can also be used. Nitrogen containing sulfur compounds, for example, tetrasulfur dinitride, tetrasulfur tetranitride, and trihiazylchloride can also be used albeit with extreme caution, in accordance with the invention. Oxides of sulfur, for example sulfur dioxide, sulfur heptoxide, sulfur monoxide, sulfur sesquioxide, sulfur tetraoxide, sulfur trioxide, trisulufur dinitrogen dioxide, sulfur monooxytetrachloride, and sulfur trioxytetrachloride are also suitable for use. The sulfur source can also be selected from sulfuric acids, for example, permonosulfuric acid, per(di)sulfuric acid and pyrosulfuric acid. Sulfurous acid is also suitable for use. Sulfuryl chlorides, for example sulfuryl chloride fluoride and pyrosulfuryl chloride are also suitable for use.

Of course, single compositions containing more than one of aluminum, phosphorus or sulfur can be employed as a combined source. Thus suitable treating agents include inorganic compounds containing aluminum and phosphorus, for example, aluminum metaphosphate and aluminum orthophosphate. Likewise, inorganic compositions which contain aluminum and sulfur can be usefully employed as treating agents in accordance with the present invention, for example, aluminum sulfide and aluminum sulfate. Similarly, promoting agents comprising both phosphorus and sulfur can be employed in addition to aluminum, for example, phosphorus oxysulfide, tetraphosphorus heptasulfide, phosphoruspentasulfide, and tetraphosphorus trisulfide.

Examples of organic phosphorus containing promoting agents include hydrocarbylphosphines, hydrocarbylphosphine oxides, hydrocarbylphosphites and hydrocarbylphosphates. Exemplary compounds include tri-n-butylphosphine, triphenylphosphine, tri-n-butylphosphine oxide, triphenylphosphine oxide, trioctylphosphite and triphenylphosphite.

Examples of organic sulfur containing promoting agents include mercaptans, thioethers, disulfides, polysulfides, thioacids, heterocyclic sulfur compounds, and polynuclear compounds, to name but a few. Exemplary compounds include tertiary octyl mercaptan, n-butyl sulfide, tertiary amyl disulfide, tertiary butyl polysulfide, dithioacetic acid, thiophene, methyl thiophene, butylthiophene, benzothiophene, dibenzothiophene, and carbon disulfide.

The additional contacting of the cracking catalyst with promoting agent is most conveniently accomplished by contacting the cracking catalyst with aluminum compounds which additionally contain phosphorus and/or sulfur. Exemplary of these componds are the aluminum-hydrocarbyl phosphites, aluminum-hydrocarbyl phosphates, aluminum thiocarboxylates, hydrocarbyl aluminum mercaptoalkanoates, aluminum thiocarbonates, hydrocarbylaluminum hydrocarbyl mercaptides, and aluminum thiocarbamates.

Compounds which contain phosphorus and/or sulfur located at the gamma position or closer to an aluminum atom appear particularly efficient for reducing the detrimental effects of contaminating deposits on a cracking catalyst. Aluminum thiophosphates, particularly aluminum dihydrocarbyl thiophosphates because of their oil solubility and because they have been tested with good results, are the preferred treating agents of the present invention. These compounds are conveniently represented by the formula

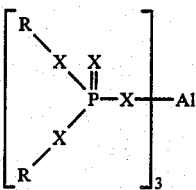

wherein R is a hydrocarbyl and due to availability normally has from 1 to about 20 carbon atoms and X is selected from the group consisting of oxygen and sulfur and at least one X is sulfur. Compositions represented by the formula

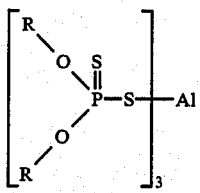

wherein R is as defined before are particularly preferred because of ease of synthesis and because they have been tested with good results. In both represented formulas, R can be alkyl, alkenyl, cycloalkyl, aryl and combinations thereof, for example, aralkyl, in nature. Examples of suitable aluminum containing treating agents containing both phosphorus and sulfur promoting agents include aluminum tris(dipropyl phosphate), aluminum tris(O,O-dipropyl phosphorothioate), aluminum tris-(O,O-dipropylphosphorodithioate, aluminum tris(O,S-dipropyl phosphorothioate), aluminum tris(S,S-dipropylphosphorodithioate), aluminum tris(O,S-dipropylphosphorodithioate), aluminum tris(S,S-dipropylphosphorotrithioate), and aluminum tris (S,S-dipropylphosphorotetrathioate). In addition, the propyl groups in the preceding examples can be replaced with, for example, methyl, butyl, octyl, ethyl, cyclohexyl, phenyl, hexenyl radicals and the like. An example is aluminum (O-methyl S-phenyl phosphorodithioate). Aluminum tris(di-n-propylphosphorodithioate) is the treating agent presently preferred because it has been tested with good results.

Generally, the amount of aluminum containing treating agent contacted with the cracking catalyst is a "passivating amount." By passivating amount is meant an amount of treating agent which is sufficient to mitigate at least one of the deleterious effects caused by deposition on the cracking catalyst of at least one contaminant selected from the group of nickel, vanadium and iron, such as, for example, decreased catalyst activity for feedstock conversion, decreased catalyst selectivity for gasoline production, increased hydrogen production and increased coke production.

Although not intending to be bound to any particular theory of operation, it is believed that the decomposition products of the aluminum containing treating agent react with the contaminant present on the cracking catalyst in such a way as to decrease the activity of the contaminants for detrimentally affecting the cracking process. It is therefore believed that an effect of the contact between the cracking catalyst and a passivating amount of aluminum containing treating agent is an increase in the aluminum concentration of the cracking catalyst. However, for many applications, the increased aluminum concentration in the cracking catalyst may be too small to measure as most commercial cracking catalysts contain substantial amounts of aluminum.

Generally, a sufficient amount of the aluminum-containing treating agent is contacted with the cracking catalyst to impart to the cracking catalyst a concentration of added aluminum of between about 1 and about 100,000 parts per million (0.0001 to 10 percent) by weight of cracking catalyst after treatment. Where an alumina-containing cracking catalyst is treated, the added aluminum will be manifested as an increased aluminum concentration in the cracking catalyst. It is preferred to contact the cracking catalyst with a sufficient amount of aluminum-containing treating agent to impart to the cracking catalyst a concentration of added aluminum of between about 200 and about 20,000 parts per million by weight of cracking catalyst after treatment, because treated cracking catalysts having concentrations of added aluminum within this range have been tested with good results.

Generally, the amount of aluminum added to the cracking catalyst should be an amount sufficient to impart to the cracking catalyst a ratio of weight of added aluminum to vanadium equivalents on the cracking catalyst of between about 1:1000 to about 10,000:1,000. More preferably, the added aluminum is in an amount sufficient to impart to the cracking catalyst a ratio of weight of added aluminum to vanadium equivalents on the cracking catalyst of between 5:1000 to 5,000:1000. Most preferably, the added aluminum is in an amount sufficient to impart to the cracking catalyst a ratio of weight of added aluminum to vanadium equivalents of between about 50:1000 to about 500:1000, because treated cracking catalysts having weight added aluminum:vanadium equivalents ratios within this range have been tested with good results.

The present invention has particular utility for improving the cracking characteristics of cracking catalysts having deposited thereon 3,000 ppm amd greater of vanadium equivalents. Untreated cracking catalysts have usually developed undesirable cracking behavior at a contamination level of 3,000 vanadium equivalents. Treatment of the cracking catalyst in accordance with the present invention is effective to mitigate the undesirable cracking behavior of cracking catalysts having deposited thereon 3,000 ppm vanadium equivalents, 10,000 ppm vanadium equivalents and even 20,000–50,000 vanadium equivalents and beyond of contaminants.

In the embodiment of the invention wherein phosphorus and/or sulfur-containing promoting agents are contacted with the cracking catalyst in addition to aluminum, the amount of aluminum contacted with the cracking catalyst can be within the ranges as defined above. The amount of sulfur and/or phosphorus contacted with the cracking catalyst in addition to the aluminum can be selected over a broad range. Generally, a promoting amount of sulfur and/or phosphorus is contacted with the cracking catalyst. For example, aluminum and phosphorus can be contacted with the cracking catalyst at any suitable weight ratio such as a weight ratio of aluminum to phosphorus of between about 5:1 to about 1:5, with a weight ratio of between about 1:2 to about 1:4 being preferred because cracking catalysts treated with ratios within this range have been tested with good results. A suitable weight ratio of aluminum to sulfur with which the cracking catalyst can be contacted can be selected from a relatively broad range, such as for example within the range of from about 1:1 to about 1:20, with a range from about 1:4 to about 1:10 being prefered. Cracking catalysts contacted with compositions having aluminum:sulfur weight ratios within this latter range have been tested with good results. The above weight ratios are suitable when employing either or both phosphorus and sulfur with aluminum.

Any suitable method can be used to contact the treating agent comprising a source of aluminum and optionally at least one of a source of phosphorus and sulfur with the catalyst. It can be mixed with the catalyst as a finely divided solid and dispersed by rolling, shaking, stirring, etc. Or, it can be dissolved in a suitable solvent, aqueous or organic, and the resulting solution used to impregnate the cracking catalyst—followed by drying to remove the solvent. Or, it can be sprayed on the catalyst, such as by being dissolved or suspended in the feedstock to a catalytic cracking unit.

The time required to effect a contact between the treating agent and cracking catalyst is not particularly important. Generally, for a batch treatment outside of a catalytic cracker such time period can range from 0 to 30 minutes. Likewise, the temperature at which the contact is effected can be selected from a wide range of values, depending, for example, on whether the treating agent is contacted with the cracking catalyst as a vapor or as in solution with a relatively low boiling solvent.

The cracking catalysts which can be advantageously treated in accordance with the above-described process are generally any of those cracking catalysts employed for the catalytic cracking of hydrocarbons boiling above 400° F. (204° C.) in the absence of added hydrogen which have become partially deactivated by deposits of contaminating metals thereon. Treatment of such contaminated cracking catalysts in the above-described manner produces the modified cracking catalyst of the present invention. These cracking catalysts generally contain silica or silica alumina and are frequently and preferably associated with zeolithic materials. Generally, from 1 to 60 percent, usually from about 30 to about 40% by weight of the catalyst will comprise zeolithic materials. The zeolitic materials can be naturally occuring or synthetic, and such materials can be produced by ion exchange methods and provided with metallic ions which improve the activity of the catalyst. Zeolite-modified silica alumina catalysts are particularly applicable to this invention because of their high activity and selectivity. Examples of metals contaminated cracking catalysts into or onto which a source of aluminum and optionally a source of at least one of phosphorus and sulfur can be incorporated include hydrocarbon cracking catalysts obtained by admixing an inorganic oxide gel with an aluminosilicate, and aluminosilicate compositions which are strongly acidic as the result of treatment with a fluid medium containing at least one rare earth metal cation and a hydrogen ion, or ion capable of conversion to a hydrogen ion.

It is inherent in this invention that the treated cracking catalyst will be subjected to elevated temperatures. When utilized in a continuous cracking process, the treated cracking catalyst can be subjected to temperatures between 800° F. (427° C.) and 1200° F. (649° C.) in the cracking zone and temperatures between 1000° F. (538° C.) and 1500° F. (816° C.) in the regeneration zone. Generally free oxygen containing gas is present in the regeneration zone. The contacting of the treating agent with the cracking catalyst can occur in the cracking zone, in the regeneration zone, or in the catalyst stream between the two zones.

A further embodiment of the present invention is directed to a catalytic cracking process wherein a hydrocarbon feedstock is contacted with the above-described modified cracking catalyst under cracking conditions to produce a cracked product. Such cracking operations are generally carried out at temperatures between 800° F. (427° C.) and about 1200° F. (649° C.) at pressures within the range of subatmospheric to several hundred atmospheres. A preferred example of this embodiment of the invention utilizes a cyclic flow of catalyst between a fluidized cracking zone and a regeneration zone in a cracking reactor. Such a system is well known to those skilled in the art.

Specific conditions in the cracking zone and the regeneration zone of a fluid catalytic cracker depend on the feedstock used, the condition of the catalyst, and the products sought. In general, conditions in the cracking zone include:

TABLE I

| | |
|---|---|
| Temperature: | 427–649° C. (800–1200° F.) |
| Contact time: | 1–40 seconds |
| Pressure: | 10 kiloPascals to 21 megaPascals (0.1 to 205 atm.) |
| Catalyst:oil ratio: | 3/1 to 30/1, by weight |

Conditions in the regeneration zone include:

TABLE II

| | |
|---|---|
| Temperature: | 538–816° C. (1000–1500° F.) |
| Contact time: | 2–40 minutes |
| Pressure: | 10 kiloPascals to 21 megaPascals (0.1 to 205 atm.) |
| Air rate (at 16° C. 1 atm.): | 100–250 ft³/lb coke, (6.2–15.6 m³/kg coke.) |

The feedstocks introduced into the catalytic cracking unit are generally oils having an initial boiling point of above 204° C. This includes gas oils, fuel oils, topped crude, shale oil and oils from coal and/or tar sands.

Such feedstocks can and usually do contain a significant concentration of at least one metal selected from vanadium, iron and nickel. Because these metals tend to be concentrated in the least volatile hydrocarbon fractions suitable for use as feedstocks, a process for cracking these heavy oil fractions is probably the most important embodiment of this invention. Currently, the industry obtains only economically marginal results when cracking feedstocks containing from about 50 to about 100 parts per million of total effective metals, where total effective metals is defined herein as the sum of the elemental weights of iron, vanadium and four times the weight of nickel in 1,000,000 parts by weight of feedstock, including the iron, vanadium and nickel contained therein. In accordance with the present invention, feedstocks containing 50–100 parts per million of total effective metals, and even those containing 100–200 parts per million of total effective metals and beyond can be economically cracked to produce gasoline and other light distillates. The quantity of added aluminum required to passivate vanadium, iron and nickel is related directly to the concentration of these metals in the feedstock. In a preferred embodiment, the aluminum containing treating agent is dissolved or suspended in a suitable solvent and ntroduced into the catalytic cracking unit along with the hydrocarbon feedstock. It is advantageous to employ a concentration of aluminum in the hydrocarbon feedstock in relationship to the contaminating metals concentration in the feedstock as shown by the following table.

TABLE III

| Total Effective Metals in Feedstock, ppm | Aluminum Concentration in Feedstock (ppm) |
|---|---|
| <40-100 | 1-100 |
| 100-200 | 10-250 |
| 200-300 | 25-500 |
| 300-800 | 50-1000 |

This invention is illustrated by the following example.

EXAMPLE I

A commercial cracking catalyst that had been used in a commercial fluid catalytic cracker until it had attained equilibrium composition with respect to metals accumulation (catalyst was being removed from the process system at a constant rate) was used to demonstrate passivation with aluminum. The catalyst, being a synthetic zeolite combined with amorphous silica/alumina (clay), was predominantly silica and alumina. Concentrations of other elements together with pertinent physical properties are shown in Table IV.

TABLE IV

| Surface area, $m^2 g^{-1}$ | 74.3 |
|---|---|
| Pore volume, ml $g^{-1}$ | 0.29 |
| Composition, wt. % | |
| Nickel | 0.38 |
| Vanadium | 0.60 |
| Iron | 0.90 |
| Cerium | 0.40 |
| Sodium | 0.39 |
| Carbon | 0.06 |

A portion of this used, metals-contained catalyst was treated with aluminum as follows. A solution, prepared by dissolving 1.59 gm of aluminum phenoxide in 35 ml cyclohexane, was stirred into 35 gm of the used catalyst. Solvent was removed by heating, with stirring, on a hot plate at about 260° C. This treatment added 0.40 wt. % aluminum to the catalyst. The treated catalyst was then prepared for testing by aging it as follows. The catalyst, in a quartz reactor, was fluidized with nitrogen while being heated to 482° C., then it was fluidized with hydrogen while the temperature was raised from 482° C. to 649° C. Maintaining that temperature, fluidzation continued for 5 minutes with nitrogen, then for 15 minutes with air. The catalyst was then cooled to about 482° C., still being fluidized with air. The catalyst was then aged through 10 cycles, each cycle being conducted in the following manner. The catalyst at about 482° C. was fluidized with nitrogen for one minute, then heated to 510° C. during two minutes while fluidized with hydrogen, then maintained at 510° C. for one minute while fluidzied with nitrogen, then heated to about 649° C. for 10 minutes while fluidized with air, and then cooled to about 482° C. during 0.5 minutes while fluidized with air. After 10 such cycles it was cooled to room temperature while being fluidized with nitrogen.

The used catalyst and the aluminum-treated catalyst were evaluated in a fluidized bed reactor using topped West Texas crude oil as feedstock to the cracking step. The cracking reaction was carried out at 510° C. and atmospheric pressure for 0.5 minutes, and the regeneration step was conducted at about 649° C. and atmospheric pressure for about 30 minutes using fluidizing air, the reactor being purged with nitrogenn before and after each cracking step.

Properties of the topped West Texas crude used in the cracking steprs are summarized in Table V.

TABLE V

| API gravity at 15.6° C. | 21.4° |
|---|---|
| Distillation (by ASTM D 1160-61) | |
| IBP | 291° C. |
| 10% | 428 |
| 20% | 468 |
| 30% | 498 |
| 40% | 528 |
| 50% | 555 |
| Carbon residue, Ramsbottom | 5.5 wt. % |
| Analysis for some elements | |
| Sulfur | 1.2 wt. % |
| Vanadium | 5.29 ppm |
| Iron | 29.0 ppm |
| Nickel | 5.24 ppm |
| Pour point (by ASTM D 97-66) | 17° C. |
| Kinematic viscosity (by ASTM D 445-65) | |
| at 82.2° C. | 56.5 centistokes |
| at 98.9° C. | 32.1 centistokes |

Results of the tests using the two catalysts are summarized in Table VI.

TABLE VI

| Catalyst | Used | Used, + 0.40% Al |
|---|---|---|
| Catalyst:Oil weight ratio | 7.7 | 7.2 |
| Conversion, Vol. % of feed | 74.9 | 79.8 |
| Gasoline Selectivity, | 72.9 | 81.0 |
| Vol. % of Conversion | | |
| Yields | | |
| Coke, wt. % of feed | 17.6 | 14.0 |
| SCF $H_2$/bbl feed converted | 895 | 704 |
| Gasoline, Vol. % of feed | 54.6 | 64.6 |
| Material balance, wt. % | 100.7 | 99.9 |

This comparison of the two catalysts show that the addition of 0.4 wt. percent aluminum, as aluminum phenoxide, to the metals-contaminated cracking catalyst increased conversion of the feedstock by 6.6%, at a catalyst/oil ratio about 6% lower than in the control, increased the selectivity of the catalyst for gasoline production in excess of 6%, in spite of the higher conversion level, increased gasoline yield by 18%, and decreased both the production of coke and the formation of hydrogen by 21%.

EXAMPLE II

A commercial cracking catalyst that had been used in a fluid catalytic cracker until it had attained equilibrium composition with respect to metals accumulation was characterized by the following properties:

TABLE VII

| Surface Area, $m^2/g$ | 75.9 |
|---|---|
| Pore vol., mL/g | 0.36 |
| Composition, wt. % | |
| Nickel | 0.38 |
| Vanadium | 0.58 |
| Iron | 0.85 |
| Cerium | 0.39 |
| Sodium | 0.46 |
| Carbon | 0.06 |

A portion of the catalyst characterized above was treated to contain phosphorus by impregnation with di-n-propylphosphorodithioic acid (DNPPTA) $(C_3H_7O)_2PS_2H$). This was done as follows. A solution containing 4.65 g DNPPTA in dry cyclohexane was used to cover 40 g of catalyst. The mixture ws warmed on a hot plate, with stirring, until the solvent had evaporated. Dry catalyst was placed in a quartz reactor and aged as described in Example I.

The used catalyst and the DNPPTA-treated catalyst were tested in a fluidized bed reactor as described in Example I. Results of the tests were as follows:

TABLE VIII

| Additive | None | 1.7 wt. % P[1] | |
|---|---|---|---|
| Catalyst/Oil Ratio | 7.4/1 | 7.5/1 | 7.4/1 |
| Conversion, Vol. % | 82.0 | 72.7 | 71.0 |
| Gasoline Selectivity Vol. % of Conversion | 68.3 | 67.6 | 65.2 |
| Yields | | | |
| Coke, Wt. % | 16.0 | 14.2 | 15.8 |
| SCF $H_2$/B Conv. | 720 | 602 | 620 |
| Gasoline, Vol. % | 56.0 | 49.1 | 47.3 |

[1]Source of P was $(C_3H_7O)_2PS_2H$

As shown by Table VIII, the addition of phosphorus to metals-contaminated FCC catalyst via impregnation with DNPPTA reduced hydrogen yield by about 15% and reduced coke yield by about 6%. However, these benefits were at the expense of conversion, which fell about 12%, and gasoline yield, which fell about 14%. The lowered coke and hydrogen yields are probably at least partially due to the lower level of conversion. Also as shown by the above table, the selectivity of the cracking catalyst for gasoline production was lowered, even though the catalyst was employed to effect a lower level of conversion. This example demonstrates the advantages obtained by using aluminum in combination with phosphorus and sulfur.

EXAMPLE III

Aluminum tris(O,O-di-n-propylphosphorodithioate was prepared by a double decomposition reaction between aluminum chloride and potassium O,O-di-n-propylphosphorodithioate. To a solution of 4.02 gm (0.16 moles) $AlCl_3.6H_2O$ in methanol was added, dropwise, a solution of $(C_3H_7O)_2PSSK$. Solid potassium chloride precipitated during this addition. Methanol solvent was removed by evaporation in a rotary evaporator, then replaced with diethyl ether, precipitating still more potassium chloride, which was removed by filtration. Diethyl ether solvent was removed by evaporation, the last traces requiring warming in a vacuum. Slightly grey crystals remained. Elemental analysis of them showed the following. Calculated: 32.42% C, 6.35% H, 13.93% P, 4.05% Al. Found: 27.86% C, 6.62% H, 9.7% P, 3.4% Al.

The commercial crackig catalyst of Example I was treated with the above prepared aluminum tris(O,O-di-n-propylphosphorodithioate) as follows. A solution, prepared by dissolving 4.32 gm of $[(1-C_3H_7O)_2PSS]_3Al$ in 35 ml of methanol, was stirred into 35 gm of the used catalyst. Solvent was removed by heating, with stirring, on a hot plate at about 260° C. This treatment added 0.50 wt. % aluminum to the catalyst. The treated catalyst was then prepared for testing by aging it as in Example I.

The catalyst was employed to crack the feedstock set forth in Example I under the reactor conditons in Example I. The results obtained were:

TABLE IX

| Additive | None | 0.5 Wt. % Al[1] |
|---|---|---|
| Catalyst:Oil Weight Ratio | 7.7 | 7.4 |
| Conversion, Vol. % of feed | 74.9 | 78.0 |
| Gasoline Selectivity, Vol. % of Conversion | 73 | 84 |
| Yields | | |

TABLE IX-continued

| Additive | None | 0.5 Wt. % Al[1] |
|---|---|---|
| Coke, Wt. % of Feed | 17.6 | 15.0 |
| SCF $H_2$/bbl Feed Converted | 895 | 543 |
| Gasoline Vol. % of Feed | 54.6 | 65.4 |
| Material Balance, Wt. % | 100.7 | 100.3 |

[1]Al added via impregnation with $Al((C_3H_7O)_2PS_2)_3$

As shown by Table IX, the addition of Al to the catalyst as the di-n-propylphosphorodithioate increased conversion by about 4%, increased gasoline yield by about 20%, decreased coke yield by about 15%, decreased hydrogen selectivity by about 39%, and improved catalyst selectivity for gasoline production from 73% to 84% despite the higher conversion level.

As compared to untreated cracking catalysts, the modified crackig catalysts tested in Examples I, II and III modify the cracking behavior of the catalyst at a catalyst/oil ratio of 7.4/1 as follows:

TABLE X

| Additive, wt. % | 0.5 Al[1] | 1.7 P[2] | 0.5 Al + 1.7 P[3] |
|---|---|---|---|
| Percent Change over Untreated Catalyst | | | |
| Conversion, (Vol. %) | +6.6 | −12 | +4 |
| Coke (Wt. %) | −21 | −6 | −15 |
| $H_2$/Bbl Conv. | −21 | −15 | −39 |
| Gasoline, Vol. % | +18 | −14 | +20 |

[1]via $Al(OC_6H_5)_3$ impregnation
[2]via $(C_3H_7O)_2PS_2H$ impregnation
[3]via $Al((C_3H_7O)_2PS_2)_3$ impregnation The high gasoline yields and low selectivity for hydrogen production exhibited by the catalyst treated with $Al((C_3H_7O)_2PS_2)_3$ are unexpected in view of the results obtained by treatment of the cracking with $Al(OC_6H_5)_3$ or $(C_3H_7O)_2PS_2H$.

What is claimed is:

1. A process comprising contacting a zeolite modified cracking catalyst having deposited thereon at least 3,000 parts per million vanadium equivalents of contaminants selected from the group consisting of nickel, vanadium and iron with a treating agent compound represented by the formula $(RX_2PX_2)_3Al$ wherein each X is independently selected from the group consisting of oxygen and sulfur and at least one X is sulfur, and wherein R is a hydrocarbyl group having from 1 to about 20 carbon atoms so as to deposit an amount of treating agent on said cracking catalyst sufficient to reduce the deleterious effects of said contaminants.

2. A process as in claim 1 wherein the treating agent compound is mixed with a hydrocarbon feedstock and contacted with the cracking catalyst in the cracking zone of a catalytic cracking reactor.

3. A process comprising contacting a zeolite modified cracking catalyst having deposited thereon at least 3000 parts per million vanadium equivalents of contaminants selected from the group consisting of nickel, vanadium and iron with a treating agent compound represented by the formula $((RO)_2PS_2)_3Al$ wherein R is a hydrocarbyl broup having from 1 to about 20 carbon atoms so as to deposit an amount of treating agent on said cracking catalyst sufficient to reduce the deleterious effects of said contaminants.

4. A process as in claim 3 wherein both R groups are n-propyl.

5. A process as in claim 4 wherein the cracking catalyst has deposited thereon in excess of 10,000 ppm vanadium equivalents of contaminants.

6. A process as in claim 5 wherein the cracking catalyst contains from about 1 to about 60% by total weight of a zeolitic component and has deposited thereon from between about 20,000 to about 50,000 ppm vanadium equivalents of contaminants.

* * * * *

UNITED STATES PATENT AND TRADEMARK OFFICE
CERTIFICATE OF CORRECTION

PATENT NO. : 4584283
DATED : April 22, 1986
INVENTOR(S) : Brent J. Bertus et al.

It is certified that error appears in the above-identified patent and that said Letters Patent is hereby corrected as shown below:

Claim 1, line 39, "$(RX_2PX_2)_3Al$" should be "$((RX)_2PX_2)_3Al$".

Claim 3, line 55, "broup" should be "group".

Signed and Sealed this

Twenty-eighth Day of October, 1986

[SEAL]

Attest:

DONALD J. QUIGG

Attesting Officer      Commissioner of Patents and Trademarks